(12) United States Patent
Li

(10) Patent No.: US 6,585,219 B2
(45) Date of Patent: Jul. 1, 2003

(54) MULTI-FUNCTIONAL ADJUSTABLE BASE FOR SUN SHADING UMBRELLA

(76) Inventor: Wanda Ying Li, 3000 S. Ocean Dr., 15C, Hollywood, FL (US) 33019

( * ) Notice: Subject to any disclaimer, the term of this patent is extended or adjusted under 35 U.S.C. 154(b) by 0 days.

(21) Appl. No.: 10/051,921

(22) Filed: Jan. 22, 2002

(65) Prior Publication Data

US 2002/0134904 A1 Sep. 26, 2002

(30) Foreign Application Priority Data

Mar. 23, 2001 (CN) ........................................ 01240832 U

(51) Int. Cl.$^7$ ............................................... F16M 13/00
(52) U.S. Cl. ...................................................... 248/521
(58) Field of Search ................................. 248/521, 514, 248/529, 515, 523

(56) References Cited

U.S. PATENT DOCUMENTS

| | | | | | |
|---|---|---|---|---|---|
| 235,106 | A | * | 12/1880 | Steiner | 135/98 |
| 276,791 | A | * | 5/1883 | Engle, Jr. | 135/120.2 |
| 970,751 | A | * | 9/1910 | Pranke | 135/16 |
| 3,050,280 | A | * | 8/1962 | Regan | 135/90 |
| 3,304,035 | A | * | 2/1967 | Davis | 135/20.1 |
| 3,304,036 | A | * | 2/1967 | Davis | 248/229.14 |
| 3,407,825 | A | * | 10/1968 | Doyle | 135/16 |
| 3,602,466 | A | * | 8/1971 | Drowns | 248/230.2 |
| 3,765,434 | A | * | 10/1973 | Riggs | 135/16 |
| 4,747,569 | A | * | 5/1988 | Hoshino | 248/291.1 |
| 4,809,724 | A | * | 3/1989 | Fuser | 135/16 |
| 5,396,915 | A | * | 3/1995 | Bomar | 135/16 |
| D370,336 | S | * | 6/1996 | Rosier | D3/5 |
| 5,836,327 | A | * | 11/1998 | Davis | 135/16 |
| 5,887,935 | A | * | 3/1999 | Sack | 280/47.38 |
| 6,032,917 | A | * | 3/2000 | Shannon | 135/16 |
| 6,234,187 | B1 | * | 5/2001 | Izzo | 135/15.1 |

* cited by examiner

Primary Examiner—Ramon O. Ramirez
Assistant Examiner—A. Joseph Wujciak, III
(74) Attorney, Agent, or Firm—Raymond Y. Chan; David and Raymond Patent Group

(57) ABSTRACT

A multi-functional adjustable base for a sun shading umbrella having a supporting stem includes a base support, a stem rotary member rotatably supported by the base support and securely holds the supporting stem, and a controlling arrangement mounted on the base support and communicated with the stem rotary member for selectively rotating or locking up the stem rotary member. The controlling arrangement includes a transmission member, which is supported by the base support, having an engaging end adapted for engaging with the stem rotary member, and a paddle pivotally and integrally connected to the transmission member and extended outside the base support for switching the stem rotary member into one of the two states—a freely rotating state and a locked state, wherein in the freely rotating state, the stem rotary member is free to rotate with respect to the base support, while in the locked state, the stem rotary member is locked in position.

10 Claims, 2 Drawing Sheets

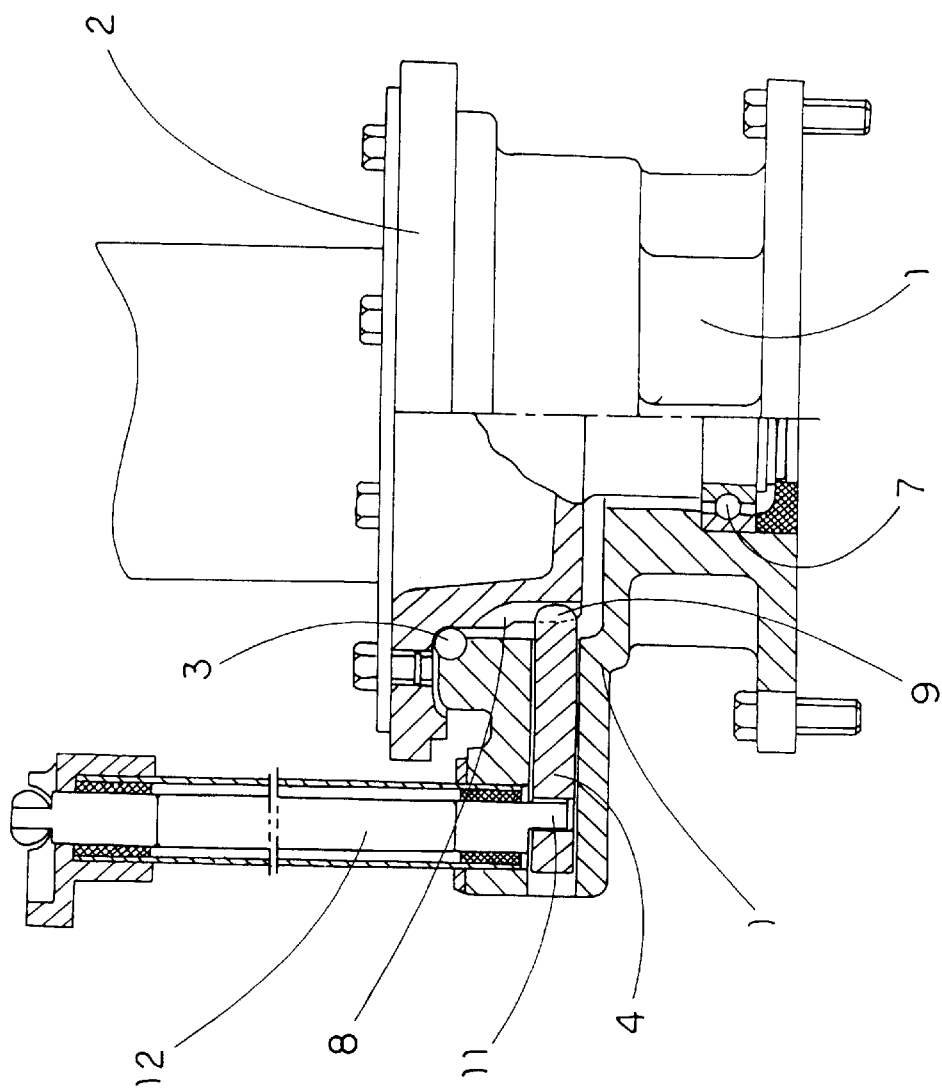

MULTI-FUNCTIONAL ADJUSTABLE BASE FOR SUN SHADING UMBRELLA

BACKGROUND OF THE PRESENT INVENTION

1. Field of Invention

The present invention relates to an umbrella support, and more particularly to a multi-functional adjustable base for a sun shading umbrella in which a user can be able to selectively adjust the orientation of the umbrella or retain the umbrella in position.

2. Description of Related Arts

Sun shading umbrellas are widespread all over the world. People usually use them to shade sunlight both at home as well as in outdoors, such as in a beach. During normal operation, one may need to rotate the umbrella's awning into different directions in order to suit different situations and environments. For example, due to the fact that the direction of sunlight is varying as time goes, the umbrella's user may want to rotate the awning into the direction of sunlight.

Conventionally a sun shading umbrella comprises a fabric-made awning, an foldable awning supporting frame on which the fabric-made awning is mounted, a supporting stem slidably supporting the fabric-made awning, and a base for firmly holding the supporting stem so that the base and the above elements connected thereon are incapable of flipping over. Right now, if a user wants to rotate the umbrella's awning, he/she may have to detach the whole supporting stem from the base and then remount it to there in a most desired orientation. However, unfortunately, not every supporting stem of sun shading umbrellas can be detachable from its base. Moreover, even this practice is practically feasible, it can be very exhaustive and, if handled carelessly, may cause the whole umbrella to flip over and hit something or somebody nearby. Thus, a sun shading umbrella which has a supporting stem rotatable while having intact stability is required.

SUMMARY OF THE PRESENT INVENTION

A main object of the present invention is to provide a multi-functional adjustable base for sun shading umbrella which allows the stem of the umbrella selectively to be rotate or to be locked up in position, while keeping the umbrella's stability intact.

Another object of the present invention is to provide a multi-functional adjustable base for sun shading umbrella which is simple in structure, easy to operate, and does not require to alter significantly the original shape and structure of the umbrella.

Accordingly, in order to accomplish the above objects, the present invention provides a multi-functional adjustable base for sun shading umbrella having a supporting stem, comprising:

a base support;

a stem rotary member rotatably supported by the base support and adapted for firmly holding the supporting stem; and a controlling arrangement, which comprises:

a transmission member supported by the base support, the transmission member having an engaging end adapted for engaging with the stem rotary member;

means for securely engaging the engaging end of the transmission member with the stem rotary member; and an activating member operatively connected to the transmission member for switching the stem rotary member between a locked state and a freely rotating state, wherein in the locked state, the stem rotary member is firmly engaged with the engaging end of the transmission member so as to restrict a rotational movement of the stem rotary member with respect to the base support, and wherein in the freely rotating state, the stem rotary member disengages with the transmission member so that the stem rotary member is capable of freely rotating with respect to the base support.

BRIEF DESCRIPTION OF THE DRAWINGS

FIG. 2 is a partially sectional side view of a multi-functional adjustable base for a sun shading umbrella according to a second preferred embodiment of the present invention.

DETAILED DESCRIPTION OF THE PREFERRED EMBODIMENT

Figure 1:
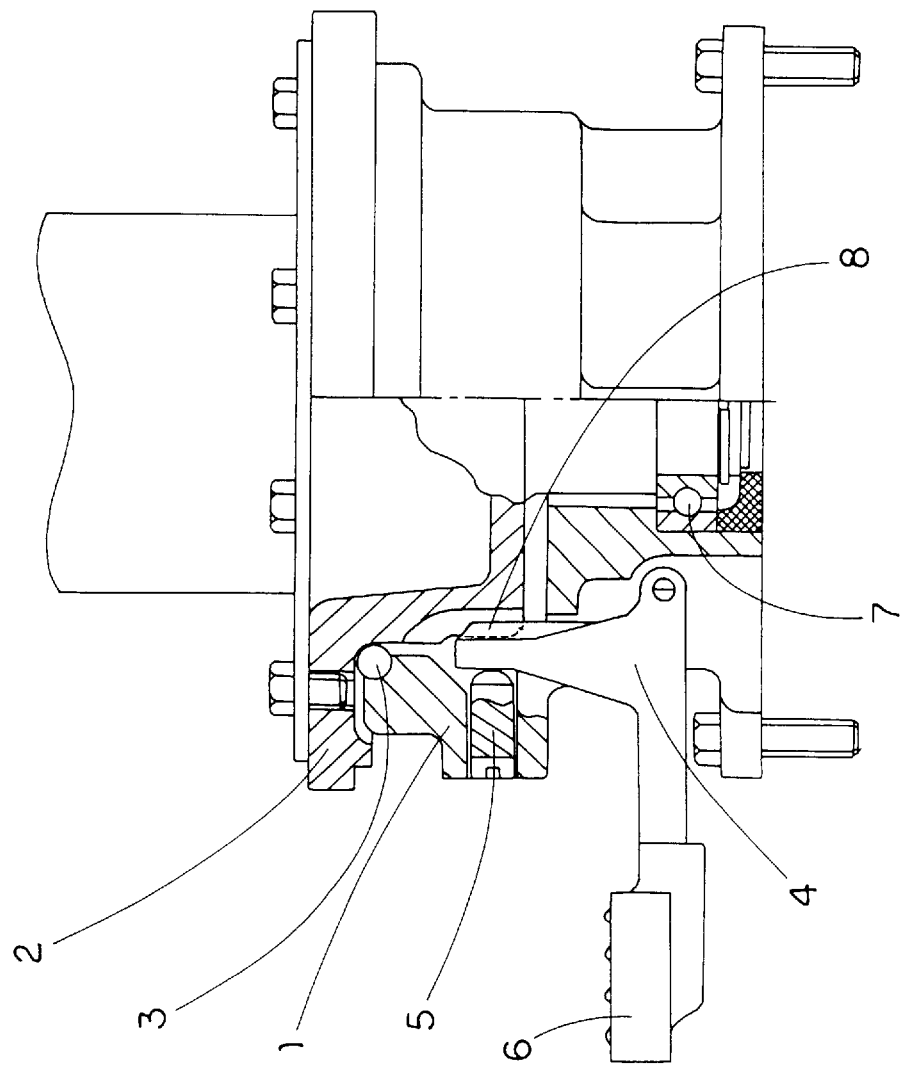
FIG. 1 is a partially sectional side view of a multi-functional adjustable base for a sun shading umbrella according to a first preferred embodiment of the present invention.

Referring to FIG. 1 of the drawings, a multi-functional adjustable base for a sun shading umbrella having a supporting stem according to a first preferred embodiment of the present invention is illustrated. According to the first preferred embodiment of the present invention, the multi-functional adjustable base for a sun shading umbrella having a supporting stem comprises a base support 1, a stem rotary member 2, rotatably supported by the base support 1, for supporting the supporting stem, and a controlling arrangement mounted on the base support 1 and communicated with the stem rotary member 2 for selectively rotating or locking up the stem rotary member 2.

The multi-functional adjustable base further comprises a plurality of rotary supports 3, such as a plurality of steel balls, supported by the base support 1 and rotatably connected to the stem rotary member 2 for facilitating a rotational movement of the stem rotary member 2 about a pivot 7 located at a bottom portion of the base support 1. Thus, the stem rotary member 2 and the supporting stem of the sun shading umbrella are capable of freely and selectively rotating with respect to the base support 1.

The controlling arrangement comprises a transmission member 4, which is supported by the base support 1, having an engaging end adapted for engaging with the stem rotary member 2, and an activating member, such as a paddle 6, and according to the first preferred embodiment of the present invention, pivotally and integrally connected to the transmission member 4 and extended outside the base support 1 for switching the stem rotary member 2 into one of the two states—a freely rotating state and a locked state, wherein in the freely rotating state, the stem rotary member 2 is free to rotate with respect to the base support 1, while in the locked state, the stem rotary member 2 is locked in position.

The controlling arrangement further comprises means for engaging the stem rotary member 2 with the engaging end of the transmission member 4 so as to selectively block up the rotational movement of the stem rotary member 2 and therefore the rotational movement of the supporting stem supported thereon. According to the first preferred embodiment of the present invention, the engaging means comprises a plurality of engaging teeth 9 radically and integrally formed on the engaging end of the transmission member 4, and at least an engaging member 8 integrally extended outwardly from an external surface of the stem rotary member 2 and adapted for securely engaging with the plurality of engaging teeth 9 formed on the transmission member 4.

The controlling arrangement further comprises a resilient element 5 mounted on the base support 1 for normally applying an inward urging force to the transmission member 4 so as to automatically retain the paddle 6 in the locked state. Thus, the stem rotary member 2 is normally retained in the locked state, i.e. the stem rotary member 2 is locked up in position, unless one changes it to the unlocked state by altering the position of the paddle 6.

The resilient element 5 according to the first preferred embodiment of the present invention is a regular compressive spring having one end mounted on the base support 1 and another end which inwardly biases against the transmission member 4 so as to normally apply an inward urging force thereto.

In order to unlock the stem rotary member 2, one has to step down the paddle 6 in order to pivotally lift up and push slightly aside the transmission member 4 which is integrally connected therewith. When the paddle 6 is stepped downwardly, the transmission member 4 is pushed in the direction of the paddle 6 and lifted up with respect to the base support 1. This action of the transmission member 4 both compresses the resilient element 5 and disengages the plurality of engaging teeth 9 of the transmission member 4 from the engaging member 8 of the stem rotary member 2. As a result, the stem rotary member 2 is free from any hurdle—which restricts its rotational movement, and therefore is capable of freely rotating with respect to the base support 1. Accordingly, the user of the adjustable base of the present invention is free to rotate the supporting stem connected to the stem rotary member 2 as desired. Remark that at this point, the stem rotary member 2 is in its freely rotating state.

In order to lock the stem rotary member 2 again, one has only to relieve the stepping force from the paddle 6. Once the stepping force is relieved, the compressed resilient element 5 pushes the transmission member 4 inwardly and rebounds it to the original position. At the same time the transmission member 4 is being inwardly pushed, it is pivotally moved downwardly as well so that the plurality of engaging teeth 9 thereof reengages with the engaging member 8 of the stem rotary member 2 again. Once the engaging teeth 9 reengages with the engaging member 8, the stem rotary member 2 is restricted from freely rotating again. At this stage, the stem rotary member 2 is regarded as in its locked state again. Accordingly, the supporting stem connected therewith is not allowed to rotate anymore.

Thus, by simply stepping down the paddle 6 and relieving the stepped paddle 6, one is able to selectively rotate the supporting stem of the sun shading umbrella to a desired orientation or lock up the supporting stem in position respectively. The objects of the present invention are therefore indisputably achieved.

However, it is worth to remark that, as an alternative, the stem rotary member 2 can be made hollow and the engaging member 8 of the engaging means can be extended inwardly from the external surface of the stem rotary member 2.

Referring to FIG. 2 of the drawings, a multi-functional adjustable base for a sun shading umbrella having a supporting stem according to a second preferred embodiment of the present invention is illustrated. The second preferred embodiment is similar to that of the first preferred embodiment as mentioned above except the controlling arrangement. Note also the absence of resilient element 5 in the second preferred embodiment. Thus, according to the second preferred embodiment of the present invention, the controlling arrangement comprises a control handle 12', which is the activating member, vertically and rotatably supported by the base support 1 and arranged to switch the stem rotary member 2' between two states—the freely rotating state and the locked state via the transmission member 4'. The control handle 12' is vertically extended outside the base support 1, for a user of the adjustable base can be able to rotate it conveniently and comfortably so as to selectively rotate or lock up the supporting stem in position.

The transmission member 4' is horizontally and movably supported by the base support 1' and rotatably connected to the control handle 12' in such a manner that when the control handle 12' is rotated, the transmission member 4' is moved horizontally, depending on the direction of the rotation, to engage with or disengage from the engaging teeth 9' of the stem rotary member 2', so as to allow the stem rotary member 2' and therefore the supporting stem to rotate or to lock up the supporting stem in position respectively.

The controlling arrangement further comprises an eccentric column 11' eccentrically and integrally formed at a bottom portion of the control handle 12' and adapted to drive the transmission member 4' to move horizontally as the control handle 12' rotates. On the other hand, the transmission member 4' has a connecting hole 10' formed thereon and positioned for securely receiving the eccentric column 11'. Due to the eccentric nature of the eccentric column 11', when the control handle 12' rotates, the transmission member 4' moves horizontally as a result.

According to the second preferred embodiment of the present invention, the stem rotary member 2' is normally kept in its locked state. In other words, the engaging teeth 9' formed thereon are engaged with the engaging member 8' formed on the stem rotary member 2' so that it is incapable of rotating. When the control handle 12' rotates, it drives the transmission member 4' to move in the direction toward the control handle such that the engaging teeth 9' formed thereon disengage with the engaging member 8' of the stem rotary member 2'. Once the engaging member 8' is disengaged from the engaging teeth 9', as in the case of the first preferred embodiment disclosed above, the stem rotary member 2' is capable of freely rotating and the user of the adjustable base is able to rotate the supporting stem into a desired orientation.

In order to relock the supporting stem in the desired position, one has to rotate the control handle 12' in the direction opposite to that of unlocking the stem rotary member 2'. When the control handle 12' is so rotated, the transmission member 4' eccentrically connected thereto is driven to move in the direction of the stem rotary member 2'. Eventually, the engaging teeth 9' is moved to reengage with the engaging member 8' formed on the stem rotary member 2' and the stem rotary member 2' is locked again.

What is claimed is:

1. A multi-functional adjustable base for a sun shading umbrella having a supporting stem, comprising:

a base support;

a stem rotary member rotatably supported by said base support and adapted for firmly holding the supporting stem; and a controlling arrangement, which comprises:
  a transmission member, which is pivotally supported by said base support, having an engaging end adapted for engaging with said stem rotary member;
  means for securely engaging said engaging end of said transmission member with said stem rotary member, wherein said engaging means comprises a plurality of engaging teeth radically and integrally formed on said engaging end of said transmission member, and at least one engaging member extended outwardly from an external surface of said stem rotary member and adapted for securely engaging with said plurality of engaging teeth of said transmission member;
  an activating member operatively connected to said transmission member for switching said stem rotary member between a locked state and a freely rotating state, wherein in said locked state, said stem rotary member is firmly engaged with said engaging end of said transmission member so as to restrict a rotational movement of said stem rotary member with respect to said base support, and wherein in said freely rotating state, said stem rotary member disengages with said transmission member so that said stem rotary member is capable of freely rotating with respect to said base support, wherein said activating member comprises a paddle integrally and transversely connected to said transmission member and extended outside said base support, so that when said paddle is depressed downwardly by a depressing force, said engaging end of said transmission member is pivotally moved aside toward said paddle, and at the same time, lifted up to disengage said plurality of said engaging teeth from said engaging member of said stem rotary member so as to allow said free rotational movement of said stem rotary member;
  a resilient element having one end mounted on said base support and another end arranged for biasing against said transmission member so as to normally apply a transverse pushing force toward said transmission member so as to automatically lower said engaging end of said transmission member and let said engaging end of said transmission member reengaging with said engaging member of said stem rotary member when said depressing force of said paddle is relieved; and
  a plurality of rotary supports supported by said base support and rotatably connected to said stem rotary member for facilitating said rotational movement thereof with respect to said base support.

2. The adjustable base, as recited in claim 1, wherein said resilient element is a compressive spring.

3. A multi-functional adjustable base for a sun shading umbrella having a supporting stem, comprising:
  a base support;
  a stem rotary member rotatably supported by said base support and adapted for firmly holding the supporting stem, wherein said stem rotary member is hollow having an external surface and an hollow cavity defined therebetween; and
  a controlling arrangement, which comprises:
    a transmission member, which is pivotally supported by said base support, having an engaging end adapted for engaging with said stem rotary member;
    means for securely engaging said engaging end of said transmission member with said stem rotary member, wherein said engaging means comprises a plurality of engaging teeth radically and integrally formed on said engaging end of said transmission member, and at least one engaging member extended inwardly from an external surface of said stem rotary member and adapted for securely engaging with said plurality of engaging teeth of said transmission member;
    an activating member operatively connected to said transmission member for switching said stem rotary member between a locked state and a freely rotating state, wherein in said locked state, said stem rotary member is firmly engaged with said engaging end of said transmission member so as to restrict a rotational movement of said stem rotary member with respect to said base support, and wherein in said freely rotating state, said stem rotary member disengages with said transmission member so that said stem rotary member is capable of freely rotating with respect to said base support, wherein said activating member comprises a paddle integrally and transversely connected to said transmission member and extended outside said base support, so that when said paddle is depressed downwardly by a depressing force, said engaging end of said transmission member is pivotally moved aside toward said paddle and, at the same time, lifted up to disengage said plurality of said engaging teeth from said engaging member of said stem rotary member so as to allow said free rotational movement of said stem rotary member;
    a resilient element having one end mounted on said base support and another end arranged for biasing against said transmission member so as to normally apply a transverse pushing force toward said transmission member so as to automatically lower said engaging end of said transmission member and let said engaging end of said transmission member reengaging with said engaging member of said stem rotary member when said depressing force of said paddle is relieved; and
    a plurality of rotary supports supported by said base support and rotatably connected to said stem rotary member for facilitating said rotational movement thereof with respect to said base support.

4. The adjustable base, as recited in claim 3, wherein said resilient element is a compressive spring.

5. A multifunctional adjustable base for a sun shading umbrella having a supporting stem, comprising:
  a base support;
  a stem rotary member rotatably supported by said base support and adapted for firmly holding the supporting stem; and
  a controlling arrangement, which comprises:
    a transmission member, which is horizontally supported by said base support, having an engaging end adapted for engaging with said stem rotary member;
    means for securely engaging said engaging end of said transmission member with said stem rotary member, wherein said engaging means comprises a plurality of engaging teeth radically and integrally formed on said engaging end of said transmission member, and at least one engaging member extended outwardly from an external surface of said stem rotary member and adapted for securely engaging with said plurality of engaging teeth of said transmission member; and
    an activating member operatively connected to said transmission member for switching said stem rotary member between a locked state and a freely rotating state, wherein in said locked state, said stem rotary member is firmly engaged with said engaging end of said transmission member so as to restrict a rotational movement of said stem rotary member with respect to said base support, and wherein in said freely rotating state, said stem rotary member disengages with said transmission member so that said stem rotary member is capable of freely rotating with respect to said base support, wherein said activating member comprises a control handle rotatably and perpendicularly connected to said transmission member in such a manner that when said control handle is rotated, said transmission member is driven to move horizontally so that said engaging end thereof is pushed and pulled to engage and disengage with said engaging member of said stem rotary member respectively, said control handle being extended outside said base support for switching said stem rotary member between two said freely rotating state and said locked state.

6. The adjustable base, as recited in claim 5, wherein said controlling arrangement further comprises an eccentric column eccentrically and integrally extended from a bottom portion of said control handle, and wherein said transmission member has an connecting hole for securely receiving said eccentric column, so that by rotating said control handle, said transmission member is driven to move horizontally to selectively engage with and disengage from said engaging member formed on said stem rotary member.

7. The adjustable base, as recited in claim 6, further comprises a plurality of rotary supports supported by said base support and rotatably connected to said stem rotary member for facilitating said rotational movement thereof with respect to said base support.

8. A multi-functional adjustable base for a sun shading umbrella having a supporting stem, comprising:

a base support;

a stem rotary member rotatably supported by said base support and adapted for firmly holding the supporting stem, wherein said stem rotary member is hollow having an external surface and an hollow cavity defined therebetween; and a controlling arrangement, which comprises:
  a transmission member, which is horizontally supported by said base support, having an engaging end adapted for engaging with said stem rotary member;
  means for securely engaging said engaging end of said transmission member with said stem rotary member, wherein said engaging means comprises a plurality of engaging teeth radically and integrally formed on said engaging end of said transmission member, and at least one engaging member extended inwardly from an external surface of said stem rotary member and adapted for securely engaging with said plurality of engaging teeth of said transmission member; and
  an activating member operatively connected to said transmission member for switching said stem rotary member between a locked state and a freely rotating state, wherein in said locked state, said stem rotary member is firmly engaged with said engaging end of said transmission member so as to restrict a rotational movement of said stem rotary member with respect to said base support, and wherein in said freely rotating state, said stem rotary member disengages with said transmission member so that said stem rotary member is capable of freely rotating with respect to said base support, wherein said activating member comprises a control handle rotatably and perpendicularly connected to said transmission member in such a manner that when said control handle is rotated, said transmission member is driven to move horizontally so that said engaging end thereof is pushed and pulled to engage and disengage with said engaging member of said stem rotary member respectively, said control handle being extended outside said base support for switching said stem rotary member between two said freely rotating state and said locked state.

9. The adjustable base, as recited in claim 8, wherein said controlling arrangement further comprises an eccentric column eccentrically, integrally and downwardly extended from a bottom portion of said control handle, and wherein said transmission member has an connecting hole for securely receiving said eccentric column, so that by rotating said control handle, said transmission member is driven to move horizontally to selectively engage with and disengage from said engaging member formed on said stem rotary member.

10. The adjustable base, as recited in claim 7, further comprises a plurality of rotary supports supported by said base support and rotatably connected to said stem rotary member for facilitating said rotational movement thereof with respect to said base support.

* * * * *